(12) United States Patent
Morone et al.

(10) Patent No.: US 10,318,471 B2
(45) Date of Patent: Jun. 11, 2019

(54) METHOD TO SHARE DATA BETWEEN SEMICONDUCTORS CHIPS

(71) Applicant: GM GLOBAL TECHNOLOGY OPERATIONS LLC, Detroit, MI (US)

(72) Inventors: Roberto Morone, Cuneo (IT); Simone Alpe, Condove (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/618,990

(22) Filed: Jun. 9, 2017

(65) Prior Publication Data

US 2018/0357197 A1   Dec. 13, 2018

(51) Int. Cl.
*G06F 13/42* (2006.01)
*H02P 7/03* (2016.01)
*F02D 41/26* (2006.01)

(52) U.S. Cl.
CPC ......... *G06F 13/4282* (2013.01); *F02D 41/26* (2013.01); *H02P 7/04* (2016.02)

(58) Field of Classification Search
CPC .................................. F02D 41/26; H02P 7/04
See application file for complete search history.

(56) References Cited

U.S. PATENT DOCUMENTS

2004/0225418 A1* 11/2004 Barrenscheen ........... H04L 1/24
                                                                 701/1
2008/0183928 A1   7/2008 Devila et al.
2009/0193165 A1   7/2009 Hsieh et al.
2011/0078350 A1   3/2011 Carls
2011/0225339 A1   9/2011 Chen
2013/0346658 A1  12/2013 DeCesaris et al.

OTHER PUBLICATIONS

Great Britain Patent Office, Great Britain Search Report for Great Britain Application No. 1610199.0, dated Nov. 18, 2016.
Research Disclosure 479034, SPI slave select expander, Mar. 2004, Kenneth Mason Publications, Hampshire, UK.
SAE Technical Paper Series 2005-01-0057, Microsecond Bus (μSB): The New Open-Market Peripheral Serial Communication Standard, Kelling, Koenig, McNair, Apr. 11, 2005.

* cited by examiner

*Primary Examiner* — Muhammad S Islam
(74) *Attorney, Agent, or Firm* — Lorenz & Kopf, LLP

(57) ABSTRACT

A method for sharing data between a microcontroller and a plurality of driving circuits of actuators is disclosed. A microcontroller is provided with a microsecond bus and a plurality of chip-select outputs. A plurality of driving circuits have input pins for data signals received from the microcontroller through the microsecond bus. Each of the driving circuits has an input pin receiving a signal from a chip-select output of the microcontroller and at least two configuration pins connected to the ground voltage or to a supply voltage. A data frame signal is sent on the microsecond bus. Each of the driving circuits is supplied with a portion of the data frame signal as a function of the chip-select output of the microcontroller and as a function of the voltage connection of the at least two configuration pins.

14 Claims, 5 Drawing Sheets

METHOD TO SHARE DATA BETWEEN SEMICONDUCTORS CHIPS

CROSS-REFERENCE TO RELATED APPLICATION

This application claims priority to Great Britain Patent Application No. 1610199.0, filed Jun. 10, 2016, which is incorporated herein by reference in its entirety.

TECHNICAL FIELD

The technical field relates to a method to share data between semiconductors chips and, in particular, a method to optimize the data communication of semiconductor chips sharing the serial data from a first controller chip to different power chips connected to electrical load, which minimizes the number of connection, output delay and power dissipation problems.

BACKGROUND

Conventional electronics architectures usually consists in a logic controller chip (e.g. microcontroller, FPGA) and several power chips connected to the logic controller using serial or parallel data lines. In the automotive field, for example, an electronic control unit (ECU) is used to control the internal combustion engine. The microcontroller inside the ECU receives input signals from sensors associated with the internal combustion engine and generates output signals to different devices, as for example driving circuits of actuators provided to control the operation of the internal combustion engine.

The connection from the logic controller and the power chips using parallel lines (one for each output) can be critical for the very large number of lines requested and constrains in the logic controller package and related pin numbers; the use of the most serial line protocols (e.g. SPI) can be critical for the output latency. The introduction of the microsecond channel bus (MSC) solves many of the issues stated above and it is already implemented in the most diffused microcontrollers used in the automotive, as well as is available in different power driver output chips.

Current microcontrollers can serialize several parallel output lines for controlling many actuators connected to fast signals (e.g. timer outputs) using the microsecond bus. At present, known microcontrollers can support MSC up to 40 MHz with frame up to 40 bits shared between up to two devices connected and selected by the related chip-select ensuring a defined and fast data output refresh (up to 1 μs, thus the name microsecond bus). The MSC bus uses Low-Voltage Differential Signaling (LVDS, also known as TIA/EIA-644) clock and data lines from microcontroller to the devices, non-differential lines are used for chip selects and asynchronous upstream, used for diagnosis, from devices to the microcontroller. The number of chip-select outputs is a big limitation because the power dissipation limits the number of actuators controlled by a single driving circuit. For example, no more than two DC motors can be controlled by the same driving circuit. Therefore, a maximum of four DC motors could be controlled using a single microsecond bus made available by a known microcontroller.

SUMMARY

In accordance with the present disclosure, a method is provided to share data between a microcontroller and a plurality of driving circuits of actuators which extends the number of the driving circuits and/or the number of the actuators that can be controlled through the microsecond bus. The present disclosure also provides a method to share data between a microcontroller and a plurality of driving circuits of actuators which is fully compatible with current microsecond bus and microcontrollers capability. The present disclosure further provides a method to share data between a microcontroller and a plurality of driving circuits of actuators which reduces the number of microcontroller pins needed to perform the control of the driving circuits.

According to an embodiment, a method to share data between a microcontroller and a plurality of driving circuits of actuators includes: providing a microcontroller with a microsecond bus and a plurality of chip-select outputs; providing a plurality of driving circuits having input pins for data signals received from the microcontroller through the microsecond bus, wherein each of the driving circuits has an input pin receiving a signal from a chip-select output of the microcontroller and at least two configuration pins connected to the ground voltage or to a supply voltage; and sending a data frame signal on the microsecond bus. Each of the driving circuits is supplied with a portion of the data frame signal as a function of the chip-select output of the microcontroller and as a function of the voltage connection of the at least two configuration pins.

In practice, the driving circuits may be physically divided into different objects and recognize the part of the data frame signal of their interest, but the driving circuits are seen from the microcontroller as a single device. In this way, the data frame signal transferred on the microsecond bus can be shared among a number of more than two driving circuits. This permits usage of the standard electronic control units currently available in this field to increase the number of actuators that can be controlled by the microcontroller embedded in these units.

According to an embodiment, at least one of the driving circuits may include an H-bridge circuit to drive the operation of a DC motor. According to an embodiment, at least one of the driving circuits may include a LVDS buffer for clock and data signals in order to improve the signal/noise ratio and assure the correct functioning at the maximum communication speed.

According to an embodiment, the method may communicate data signals between the microcontroller and at least one of the driving circuits through the microsecond bus to configure the at least one driving circuit and read back the diagnosis of the at least one driving circuit.

According to another aspect of the present disclosure, a computer program product includes computer executable codes to share data between a microcontroller and a plurality of driving circuits of actuators. The microcontroller is provided with a microsecond bus and a plurality of chip-select outputs. A plurality of driving circuits is provided having input pins for data signals received from the microcontroller through the microsecond bus. Each of the driving circuits having an input pin for receiving a signal from a chip-select output of the microcontroller and at least two configuration pins connected to the ground voltage or to a supply voltage. The computer program product can be stored on a suitable storage unit and includes: computer executable codes for sending a data frame signal on the microsecond bus; and computer executable codes for supplying the driving circuits with a portion of the data frame signal as a function of the chip-select output of the microcontroller and as a function of the voltage connection of its at least two configuration pins. According to an embodiment, computer executable codes are provided for communicating data signals between the microcontroller and at least one of the driving circuits through the microsecond bus to configure the at least one driving circuit and read back the diagnosis of the at least one driving circuit. According to an embodiment, the above computer program product can be stored in a computer readable medium.

Another aspect of the disclosure relates to a driving circuit having input pins for at least one enable signal, one pulse width modulation signal and one direction signal of at least one actuator, wherein the driving circuit has at least two configuration pins to be connected to the ground voltage or to a supply voltage.

According to an embodiment, the driving circuit further includes a LVDS buffer for clock and data signals.

According to another embodiment, the driving circuit has an H-bridge circuit to drive the operation of a DC motor.

Another aspect of the disclosure relates to an electronic control unit having a microcontroller to perform the above method and/or execute the above computer codes.

Another aspect of the disclosure relates to an automotive system including an internal combustion engine, a plurality of actuators, a plurality of driving circuits for the actuators and an electronic control unit having a microcontroller to perform the above method.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
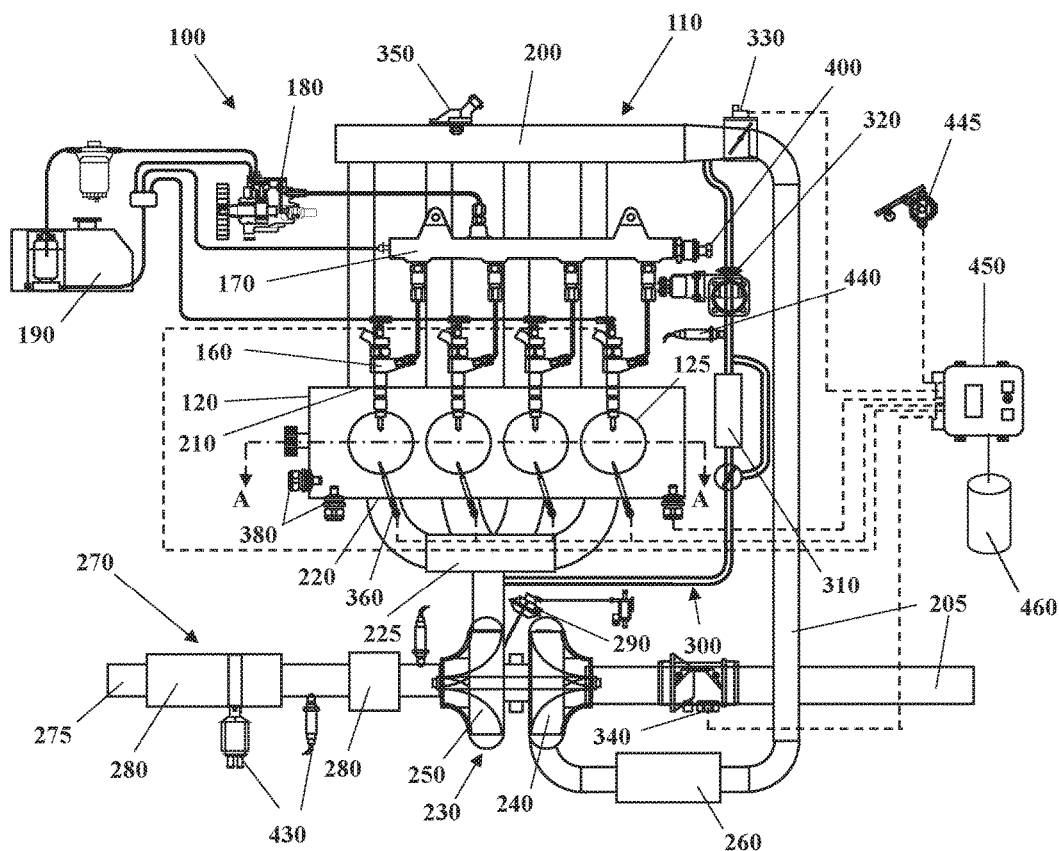
FIG. 1 shows an embodiment of an automotive system including an internal combustion engine.
Figure 2:
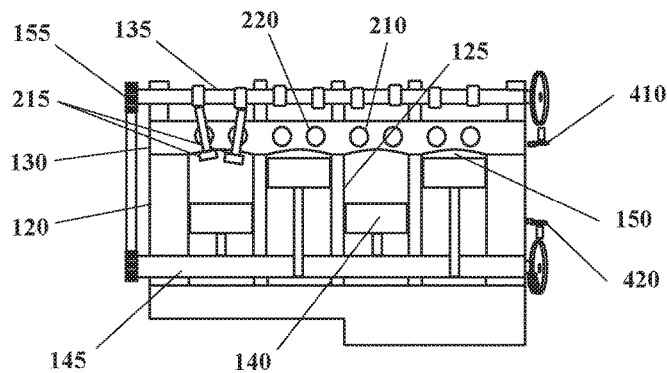
FIG. 2 is a cross-section according to the plane A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by the camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel pump 180, fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system 460, or data carrier, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices.

Instead of an ECU 450, the automotive system 100 may have a different type of processor to provide the electronic logic, e.g. an embedded controller, an onboard computer, or any processing module that might be deployed in the vehicle.

Figure 3:
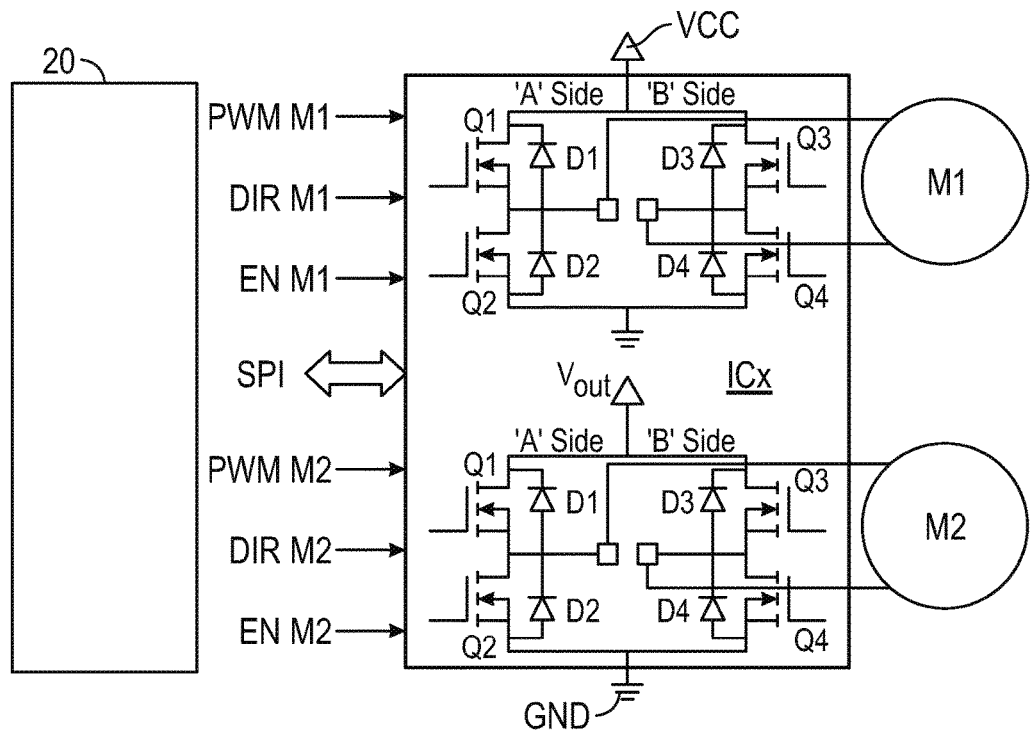
FIG. 3 is a scheme of the control of a single driving circuit according to the prior art.

DC motors are an example of actuators used in the automotive system 100 of FIGS. 1 and 2. As shown in FIG. 3, DC motors can be controlled using H-bridge circuits which are typically integrated in a single integrated circuit solution. A driving circuit ICx can control two DC motors M1 and M2 in order to limit the area occupied on a printed circuit board of the electronic control unit 450 and the power dissipation.

The microcontroller 20 shall use three signals sent in parallel configuration to the driving circuit ICx to control each DC motor M1 and M2, namely an enable signal EN to enable/disable the related DC motor, a direction signal DIR to select the direction of the rotation (forward or reverse) and a PWM signal to modulate the current supplied to the related motor to impart the rotation. A total of six signals, namely EN-M1, DIR-M1, PWM-M1 for DC motor M1 and EN-M2, DIR-M2, PWM-M2 for DC motor M2, are therefore sent in parallel configuration to the driving circuit ICx. Moreover, a communication bus SPI (Serial Protocol Interface) can be used for example to configure the driving circuit ICx and read back the diagnosis.

Figure 4:
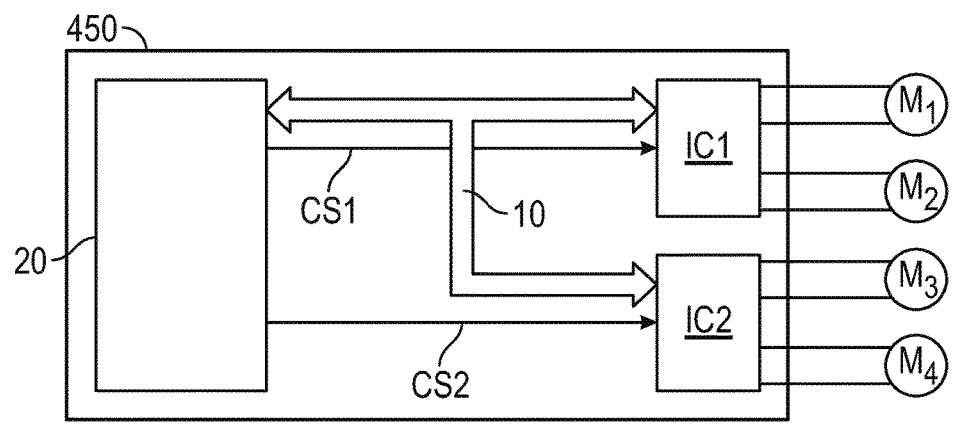
FIG. 4 is a scheme of the control of driving circuits of actuators according to the prior art.

The scheme of FIG. 4 shows an electronic control unit 450 provided with a microcontroller 20, for example a control process unit (CPU). The microcontroller 20 has a microsecond bus 10 and two chip-select outputs CS1 and CS2 for two driving circuits IC1 and IC2. In the exemplary embodiment of FIG. 4, reference is made to electric DC motors M1-M4 as actuators driven by the driving circuits IC1 and IC2.

The microcontroller 20 can serialize the control of many actuators using the microsecond bus 10 up to 40 MHz. The microcontroller 20 supports 40 bit signals shared between up to two driving circuits IC1 and IC2 connected and selected by the related chip-select outputs CS1 and CS2. The number of chip-select outputs is a big limitation because the power dissipation limits the number of actuators controlled by a single driving circuit. For example, no more than two DC motors can be controlled by the same driving circuit. Therefore, according to the prior art scheme of FIG. 4, up to a maximum of four DC motors M1-M4 could be controlled using the microsecond bus 10, so is why the use of microsecond channel bus is not usually applied in high-power driver devices.

Figure 5:
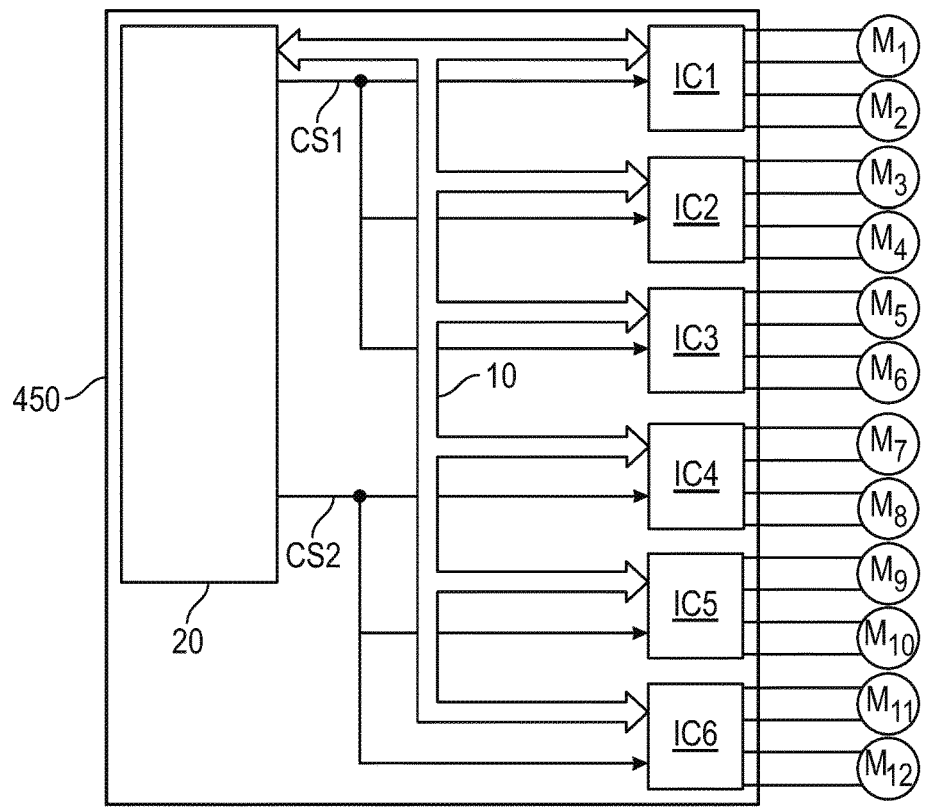
FIG. 5 is a scheme of the control of driving circuits according to an embodiment of the present disclosure.

As shown in the scheme of FIG. 5, according to the solution of the present disclosure, it is possible to extend the number of driving circuits, namely up to six driving circuits IC1-IC6, in order to drive up to twelve DC motors M1-M12 by using the output signals transmitted on the microsecond bus 10 and the only two chip-select signals CS1 and CS2 made available by the same microcontroller 20.

Figure 6:
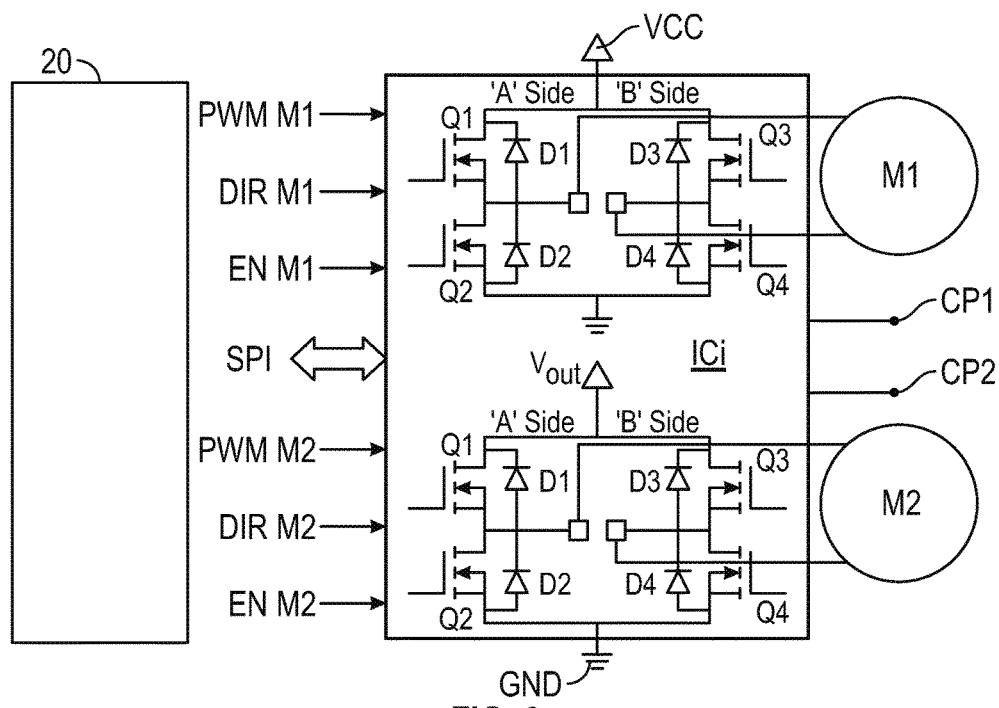
FIG. 6 is a detail of the control of a single driving circuit of FIG. 5

FIG. 6 shows one exemplary driving circuit ICi of the six circuits IC1-IC6 of FIG. 5. As in the driving circuit ICx of FIG. 4, the driving circuit ICi has two H-bridge circuits integrated in a single chip. However, the driving circuit ICi is further provided with two configuration pins CP1 and CP2 that can be directly connected by wiring to the ground voltage or to a supply voltage. Configuration pins CP1 and CP2 allow the selection of a portion of the data frame signal received from the microsecond bus without the need of changes to the microcontroller 20 currently used in the automotive field.

As already stated, the microcontroller 20 may support 40 bit signals and can be operated at 40 MHz. This means that a data frame signal of 40 control bits can be transmitted each microsecond to all the driving circuits IC1-IC6; since each driving circuit needs a total of six bits, i.e. three bits for each of the two DC motors driven by a single circuit, each of the driving circuits IC1-IC6 can be configured to consider only the six bits of the related portion of the whole data frame signal of 40 bits.

Figure 7:
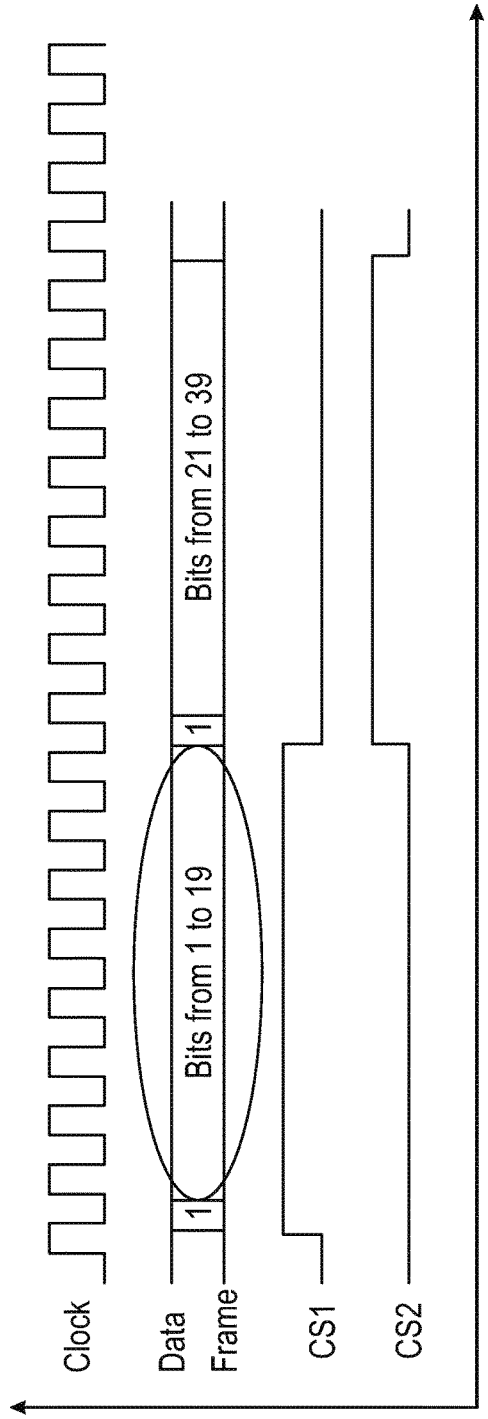
FIG. 7 is a graph of the time development of control signals according to an embodiment of the present disclosure.
Figure 8:
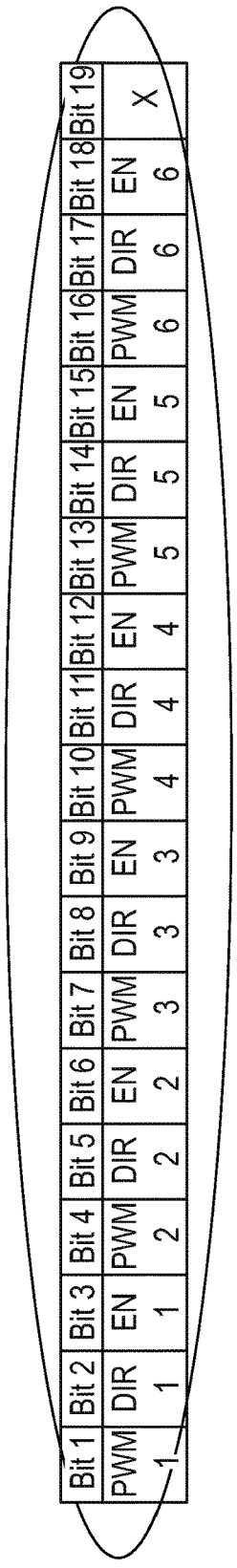
FIG. 8 is a schematic representation of a portion of data frame signal of FIG. 7.

In particular, as shown in the graph of FIGS. 7 and 8, the data frame signal sent by the microcontroller 20 is received by all the driving circuits IC1-IC6 connected on the microsecond bus 10. Each circuit consider only the portion of the data frame selected by the related chip-select CS1 and CS2 received by the microcontroller 20 and by the configuration pins CP1 and CP2 connected to ground voltage GND or supply voltage VCC.

The first three driving circuits IC1-IC3 can be selected by the chip-select signal CS1 to consider only the first bits 1 to 19 of the data frame signal. Configuration pins CP1 and CP2 of the driving circuit IC1 can be connected for example both to ground voltage GND to set the driving circuit IC1 in such a way that only bits 1 to 6 are considered. As shown in FIG. 8, the first three bits 1-3 are the data signal PWM, DIR and EN for the first DC motor M1, while the subsequent three bits 4-6 are the data signal PWM, DIR and EN for the second DC motor M2 driven by the same driving circuit IC1. Configuration pins CP1 and CP2 of the driving circuit IC2 can be connected for example to ground voltage GND and to VCC voltage, respectively. The driving circuit IC2 is set to consider only bits 7 to 12, where bits 7-9 are the data signal PWM, DIR and EN for the DC motor M3 and bits 10-12 are the data signal PWM, DIR and EN for DC motor M4 driven by IC2. In the same way, configuration pins CP1 and CP2 of the driving circuit IC3 can be connected for example to VCC voltage and to ground voltage GND, respectively. The driving circuit IC3 is then set to consider only bits 13 to 18, where bits 13-15 are the data signal PWM, DIR and EN for the DC motor M5 and bits 14-18 are the data signal PWM, DIR and EN for DC motor M6 driven by IC3.

The same strategy can be applied for driving circuits IC4, IC5 and IC6 enabled by CS2, therefore considering bits from 21 to 39 of the data frame signal.

Bits 0, 19, 20 and 39 of the data frame signal could assume any logic value because they are not significant in the present protocol.

Figure 9:
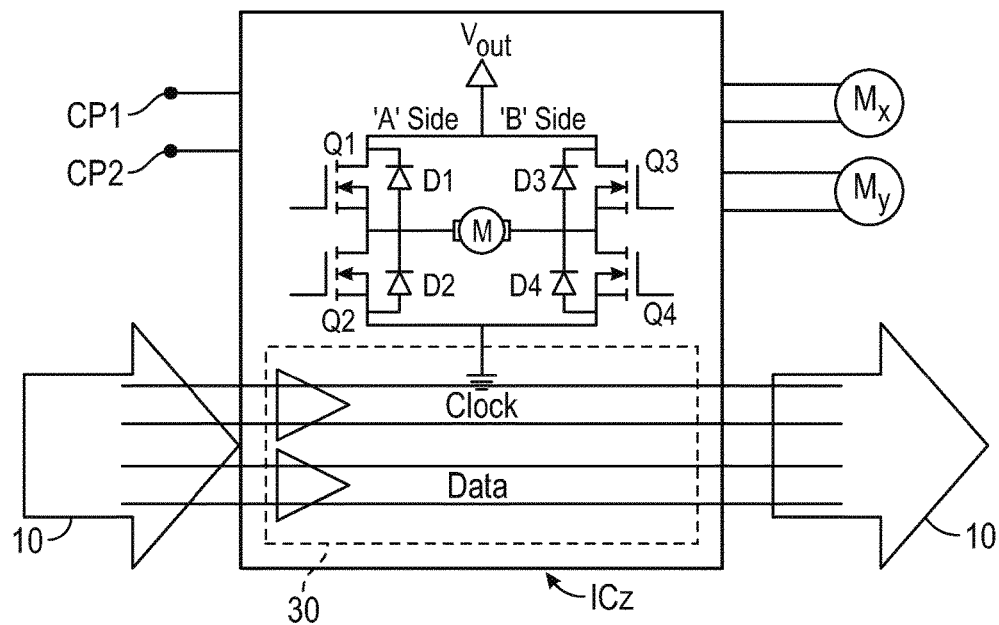
FIG. 9 is schematic view of another embodiment of a driving circuit of the present disclosure.

FIG. 9 shows another embodiment of a driving circuit ICz that can be used according to the method of the present disclosure. As in the driving circuit ICi of FIG. 6, the driving circuit ICz is provided with two configuration pins CP1 and CP2 for the selection of a portion of the data frame signal received from the microsecond bus 10. The driving circuit is further equipped with a LVDS buffer 30, shown in dotted lines, which eliminates possible signal reflections on the LVDS lines of the microsecond bus 10. The buffer 30 improves the signal/noise ratio in order to assure a correct operation at the maximum communication speed.

Figure 10:
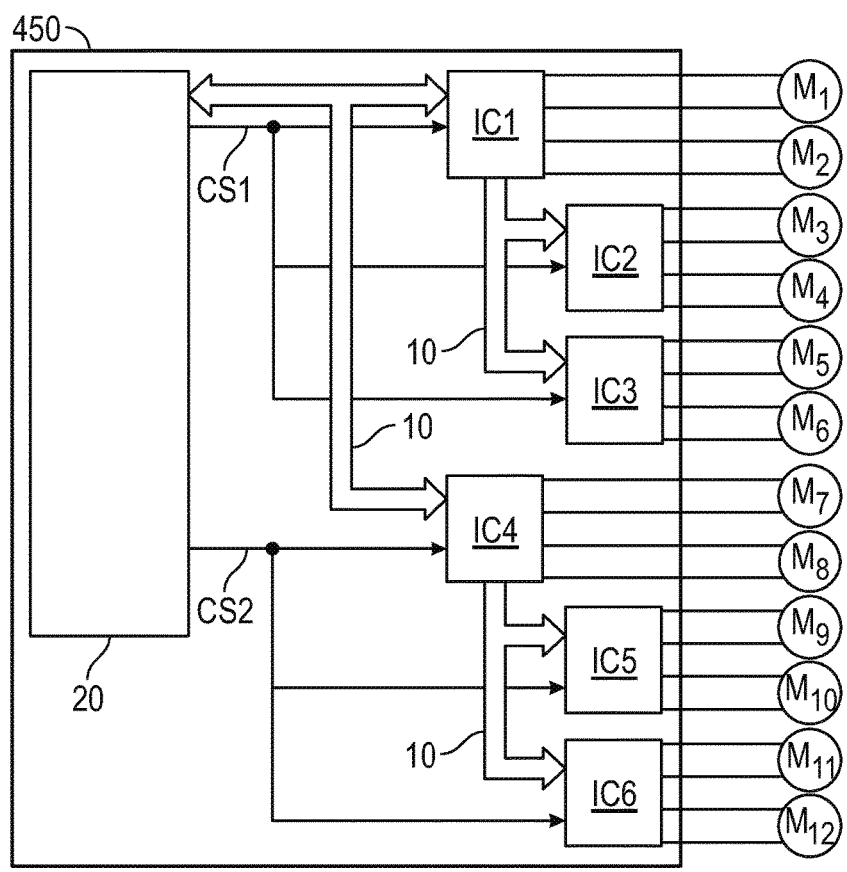
FIG. 10 is a scheme of the control by driving circuits of FIG. 9.

FIG. 10 is a scheme of the connections of the microsecond bus 10 between the microcontroller 20 and driving circuits IC1-IC6 by driving circuits IC1 and IC4 provided with a LVDS buffer 30 as the driving circuit ICz of FIG. 9. As in the scheme of FIG. 5, six driving circuits IC1-IC6 allow to drive up to twelve DC motors M1-M12 by using the output signals transmitted on the microsecond bus 10 and the only two chip-select signals CS1 and CS2 made available by the same microcontroller 20. Driving circuits IC1 and IC4 are both provided with a buffer 30 which receives the data frame signal and the clock signal in input and share the buffered signals with driving circuits IC2, IC3 and IC5, IC6 respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for sharing data between a microcontroller and a plurality of actuators each having a driving circuit comprising:
    providing a microcontroller having a microsecond bus and a plurality of chip-select outputs;
    providing a plurality of driving circuits configured to receive data signals from said microcontroller via said microsecond bus;
    connecting, by a first connection, each of the driving circuits with a supply voltage;
    connecting, by a second connection, each of the driving circuits with a ground voltage;
    receiving, by an input pin, a signal from a chip-select output of said microcontroller to the driving circuit;
    connecting, by a first configuration pin, the driving circuit with one of the supply voltage or the ground voltage;
    connecting, by a second configuration pin, the driving circuit with one of the supply voltage or the ground voltage;
    sending a data frame signal on said microsecond bus, wherein each of said driving circuits is supplied with a portion of said data frame signal; and
    determining the portion of said data frame signal supplied to a particular one of the driving circuits as a function of:
        the chip-select output of said microcontroller;
        whether the respective first configuration pin is connected with the supply voltage or with the ground connection; and
        whether the respective second configuration pin is connected with the supply voltage or with the ground connection.

2. The method according to claim 1, wherein providing a plurality of driving circuits comprises providing an H-bridge circuit for driving an operation of a DC motor.

3. The method according to claim 1, wherein providing a plurality of driving circuits comprises providing at least one LVDS buffer for clock and data signals.

4. The method according to claim 1, further comprising communicating data signals between said microcontroller and at least one of said driving circuits via said microsecond bus to configure said at least one driving circuit and read back a diagnosis of said at least one driving circuit.

5. A computer program product comprising computer executable codes stored on a non-transitory computer readable medium for sharing data between a microcontroller and a plurality of actuators each having a driving circuit, wherein said microcontroller is provided with a microsecond bus and a plurality of chip-select outputs and wherein each driving circuit is provided a first connection with a supply voltage and a second connection with a ground voltage, an input pin for receiving a signal from a chip-select output of said microcontroller, a first configuration pin connected with one of the supply voltage or the ground voltage, and a second configuration pin connected with one of the supply voltage or the ground voltage, the computer program product comprising:
    processor-executable instructions when executed on the processor in a device configure the device to send a data frame signal on said microsecond bus; and
    processor-executable instructions when executed on the processor in the device configure the device to supply said driving circuits with a portion of said data frame signal as a function of:
        the chip-select output of said microcontroller;
        whether the first configuration pin is connected with the supply voltage or with the ground connection; and
        whether the second configuration pin is connected with the supply voltage or with the ground connection.

6. The computer program product according to claim 5, further comprising processor-executable instructions when executed on the processor in the device configure the device to communicate data signals between said microcontroller and at least one driving circuit via said microsecond bus to configure said at least one driving circuit and read back a diagnosis of said at least one driving circuit.

7. An electronic control unit comprising:
    a microcontroller having a microsecond bus and a plurality of chip-select outputs;
    a plurality of driving circuits each having a first connection coupled with a supply voltage and a second connection coupled with a ground voltage, and each having input pins configured to receive data signals from said microcontroller via said microsecond bus, wherein each of said driving circuits includes an input pin configured to receive a signal from at least one of the chip-select outputs of said microcontroller, a first configuration pin connected with one of the supply voltage or the ground voltage, and a second configuration pin connected with the supply voltage or the ground voltage;
    wherein the electronic control unit is configured to send a data frame signal on said microsecond bus and each of said driving circuits is supplied with a portion of said data frame signal as a function of:
        the chip-select output of said microcontroller;

whether the first configuration pin is connected with the supply voltage or with the ground connection; and whether the second configuration pin is connected with the supply voltage or with the ground connection.

8. The electronic control unit according to claim 7, wherein each of the driving circuits comprises a first input pin for an enable signal, a second input pin for a pulse width modulation signal, and a third pin for a direction signal of an actuator.

9. The electronic control unit according to claim 7, further comprising a LVDS buffer for clock and data signals.

10. The electronic control unit according to claim 7, wherein at least one of said driving circuits comprises an H-bridge circuit configured to drive a DC motor.

11. The electronic control unit according to claim 7, wherein the data frame signal comprises a 40-bit frame, wherein the plurality of driving circuits comprises a first driving circuit configured to receive a first 1-6 bits of the 40-bit frame, a second driving circuit configured to receive a second 7-12 bits of the 40-bit frame and a third driving circuit configured to receive a third 13-19 bits of the 40-bit frame, wherein the first configuration pin of the first circuit and the second configuration pin of the second circuit are connected to the supply voltage, the second configuration pin of the first circuit and the first configuration pin of the second circuit are connected to the ground voltage and the first and second configuration pins of the third circuit are both connected to one of the supply voltage and the ground voltage to determine the portion of said data frame signal received by the first, second and third driving circuits.

12. An automotive system comprising an internal combustion engine, a plurality of actuators and the electronic control unit according to claim 7, wherein the plurality of driving circuits drive said actuators.

13. The electronic control unit according to claim 7 wherein the plurality of drive circuits comprises six drive circuits, the plurality of chip-select outputs comprises no more than two chip-select outputs delivered by the microcontroller, and comprising twelve electric motors driven by the six drive circuits.

14. The electronic control unit according to claim 11, wherein the chip-select output is configured for the first, second and third driving circuits to consider only a first 1-19 bits of the data frame signal.

* * * * *